United States Patent Office 2,871,244
Patented Jan. 27, 1959

2,871,244

PROCESS FOR THE MANUFACTURE OF ANTHRAQUINONE AND DERIVATIVES THEREOF

Jonas Kamlet, New York, N. Y., assignor to Reynolds Metals Company, Richmond, Va., a corporation of Delaware No Drawing. Application June 24, 1955
Serial No. 517,911

2 Claims. (Cl. 260—369)

This invention relates to a process for the manufacture of anthraquinone and derivatives thereof. More particularly, this invention relates to an improved process for the manufacture of compounds of the general formula:

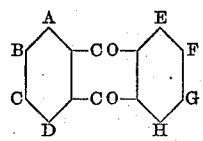

where A, B, C, D, E, F, G and H are members of the group consisting of hydrogen, alkyl substituents, chlorine and bromine. These compounds are important and widely used dyestuff intermediates.

Anthraquinone has heretofore been manufactured industrially by the following processes:

(a) Anthracene, usually in a state of purity, is oxidized in the liquid phase with chromic acid (Graebe and Liebermann, Berichte 1, 49 (1868); 2, 332 (1869), or with air in the vapor phase over a vanadium compound catalyst (Wohl, German Patents 347,610 and 349,089 (1916).

(b) Benzene is reacted with phthalic anhydride in the presence of anhydrous aluminum chloride to form an aluminum chloride salt of o-benzoylbenzoic acid, from which the free o-benzoylbenzoic acid is recovered by acidification and cyclized to anthraquinone by reaction with concentrated sulfuric acid. By using an alkylbenzene or a halogenated derivative of benzene in place of the benzene in this process, the corresponding alkylated or halogenated derivative of anthraquinone is derived (Heller, Zeit. angew. Chemic 19, 699 (1906), Berichte 41, 363) (1908). This process is employed at the present time for the manufacture of all of the anthraquinone produced in the United States and the major part of the anthraquinone manufactured abroad.

In this process, it has been found necessary to use somewhat more than two moles of anhydrous aluminum chloride for every mole of anthraquinone produced. This inorganic chemical is not inexpensive and the required consumption thereof represents by far the largest item of raw materials cost of this process. It is the purpose of this invention to provide a process for the manufacture of anthraquinone and derivatives thereof where the cost of inorganic chemicals employed as catalysts or condensing agents in place of anhydrous aluminum chloride represents a minor item of raw materials cost, whereby marked economies may be effected in the industrial preparation of these dyestuff intermediates.

The basis of my invention is the following sequence of steps:

(a) Metallic aluminum, preferably in a comminuted form, is reacted with a member of the group consisting of hydrogen chloride and hydrogen bromide, preferably as anhydrous gases, in the presence of an aromatic compound of the general formula:

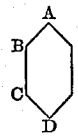

where A, B, C and D are members of the group consisting of hydrogen, alkyl substituents, chlorine and bromine, to form aluminum halide complexes of the aromatic compound;

(b) The aluminum halide complexes of the aromatic compound are reacted with a compound of the general formula:

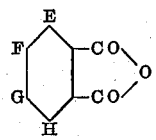

where E, F, G and H are members of the group consisting of hydrogen, alkyl substituents, chlorine and bromine, to form an aluminum salt of the corresponding o-aroylarylcarboxylic acid of the general formula

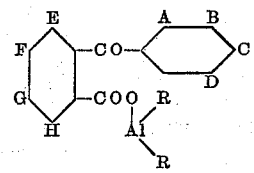

where R represents a member of the group consisting of chlorine and bromine.

(c) The aluminum salt of the o-aroylarylcarboxylic acid is reacted with concentrated or fuming sulfuric acid to form the corresponding anthraquinone derivative of general formula:

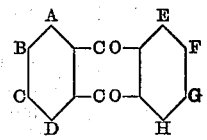

This invention may best be understood by a seriatim description of the steps thereof.

STEP (a).—FORMATION OF ALUMINUM HALIDE COMPLEX

Metallic aluminum, preferably in a comminuted form, is suspended in benzene, an alkyl benzene (e. g. toluene, ethylbenzene, o-xylene) or a halogenated benzene derivative (e. g. chlorobenzene, o-dichlorobenzene, bromobenzene) and is reacted with dry hydrogen chloride or hydrogen bromide. The reaction mixture is maintained under an efficient reflux condenser in a state of good agitation during this reaction. The dry hydrogen halide gas is passed through the reaction mixture until the quantity of aluminum required in the reaction has dissolved. Hydrogen gas is evolved during this period of reaction, and is conducted off.

The metallic aluminum employed may be in any desired form, e. g. as virgin ingot or pig aluminum or as scrap or secondary aluminum. It should preferably be in a divided or comminuted form to facilitate the reaction of the aromatic compound, hydrogen halide and aluminum to form the desired complexes. Thus, it may be employed in the form of aluminum powder, granules, chips, borings, turnings, sheet, foil, dross or in fact in any comminuted physical form desired. The availability of considerable quantities of scrap or secondary aluminum (e. g. in the form of lathe turnings or borings) at low prices makes this a preferred source for raw material for the economical operation of this process. The presence of the usual alloying elements in such secondary aluminum by-products in no way interferes with their use in the process of this invention.

The aromatic compound may be employed in the theoretical amounts required for this reaction. However, it is usually advisable to employ the aromatic compound in considerable stoichiometric excess, said excess serving as reaction medium and diluent and being ultimately recoverable and returned to the process. Alternatively, it is also feasible to employ the aromatic compound in the stoichiometric amounts required and to use an inert organic diluent (e. g. carbon bisulfide, petroleum ether, acetylene tetrachloride) as the reaction medium. Often, the reaction may be effected in a reaction medium or diluent consisting of an aromatic compound of lower reactivity than the aromatic compound of higher reactivity employed in stoichiometric quantities. Thus, ethylbenzene may be thus reacted in chlorobenzene solution, the latter aromatic compound serving as reaction medium and diluent, but not entering into the formation of aluminum halide complexes as long as the more reactive ethylbenzene is present in the reaction mixture.

The hydrogen halide gases are employed in the dry state preferably. However, if these gases contain small amounts of water, they are still serviceable in the process of this invention. The water will simply hydrolyze a portion of the aromatic compound-aluminum halide complex and make it unavailable for reaction, thus merely diminishing yields somewhat but in no way preventing the effecting of the process.

The temperature and pressure at which the interaction of the aromatic compound, aluminum and hydrogen halide is effected is by no means critical and may vary over a considerable range. Preferred conditions involve effecting this reaction at or near the reflux temperature of the aromatic compound at atmospheric pressure.

While favorable yields may be obtained employing one gram-atom of metallic aluminum for every gram-mole of phthalic anhydride (or derivative thereof), best yields are obtained employing at least two gram-atoms of aluminum for every gram-mole of phthalic anhydride (or derivative thereof). Reaction with the hydrogen halide is effected until the aluminum has completely dissolved and formed the aromatic compound-aluminum halide complexes.

While hydrogen chloride is the preferred hydrogen halide for use in this process on the basis of cheapness and availability, it may be desirable to use hydrogen bromide when it is readily and inexpensively available, because of the greater solubility of the complexes in organic solvents and their higher reactivity.

The chemical nature of these compounds is quite complex and not completely understood. Employing benzene ($C_6H_6$) as the example of the aromatic compound and hydrogen chloride as the example of the hydrogen halide, these complexes are believed to consist of one or more members of the following group of compounds: $C_6H_5AlCl_2$; $C_6H_6 \cdot AlCl_3$; $C_6H_6 \cdot 2AlCl_3$; $C_6H_5AlCl_2 \cdot AlCl_3$; $C_6H_6 \cdot AlCl_3 \cdot HCl$; $C_6H_6 \cdot 2AlCl_3 \cdot HCl$; $C_6H_6 \cdot 2AlCl_3 \cdot 2HCl$; $C_6H_5 \cdot AlCl_2 \cdot C_6H_6$ $$(C_6H_5 \cdot AlCl_2)_2 \cdot C_6H_6$$

and possibly other complexes of this type. Other aromatic compounds on the one hand and hydrogen bromide on the other hand form analogous complexes. All of these complex compounds react in the same manner in the process of this invention (Baddeley, Quarterly Reviews VIII, #4, 355–379 (1954); Brown & Pearsall, Journ. Amer. Chem. Soc. 74, 191–195 (1952); Menzel, Zeit. anorg. allgem. Chemie 269, 52–66 (1952).

It has been observed that there is a delay in the commencement of the reaction of the metallic aluminum, the hydrogen halide and the aromatic compound (i. e. an induction period). This may be obviated or shortened by the addition to the reaction mixture of a catalyst or activiator. Best activators for this purpose are the aluminum halides and the aromatic compound-aluminum halide complexes of this process themselves. Thus, this induction period may be shortened by adding to each batch 1% to 10% of the volume of the preceding batch (containing the aromatic compound-aluminum halide complex) as a "heel," or from 0.01 to 0.10 mole of anhydrous aluminum halide per gram-atom of aluminum metal employed. However, the use of such activators is by no means critical and the amounts employed may vary over wide ranges.

STEP (b).—CONDENSATION WITH PHTHALIC ANHYDRIDE

This step may be effected under a wide variety of conditions. The phthalic anhydride (or derivative thereof) may be added to the solution of aromatic compound-aluminum halide complex in excess aromatic compound or other inert diluent. Alternatively, the solution of complex may be added to phthalic anhydride (or derivative thereof) dissolved in excess aromatic compound or other inert diluent. It is also entirely feasible to effect both steps (a) and (b) of this process concurrently. It is feasible to react the metallic aluminum with the aromatic compound and the hydrogen halide in the presence of the required amount of phthalic anhydride (or derivative thereof). The aromatic compound-aluminum halide complex, as soon as formed, will react with the phthalic derivative forming the desired aluminum salt of the orthobenzoylbenzoic acid (or derivative thereof).

The reaction may be effected over a wide temperature range, e. g. between 20° C. and the refluxing temperature of the aromatic compound. However, best yields are obtained by effecting the condensation of the aromatic compound-aluminum halide complex with the phthalic derivative at a temperature between 40° C. and 50° C. Hydrogen halide gas is evolved during this reaction (and may be recovered and returned to the process). After no more hydrogen halide gas is evolved, the reaction mixture may be heated to between 50° C. and the reflux temperature of the aromatic compound to effect completion of the reaction.

STEP (c).—RING CLOSURE TO ANTHRAQUINONE

At the conclusion of the condensation of the prior step, the reaction medium and diluent may be distilled off and the residual aluminum halide salt of the ortho-aroylarylcarboxylic acid cyclized to the corresponding anthraquinone derivative by heating with three to six times its weight of concentrated or fuming sulfuric acid. Thus, for example, the following reaction occurs:

 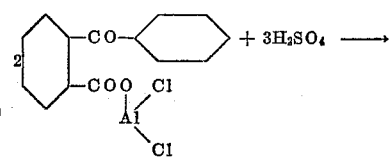

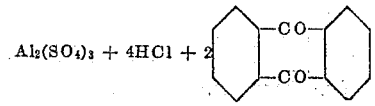

The reaction is effected by heating at temperatures between 100° C. and 175° C. until ring closure is complete e. g. for one to two hours. Hydrogen halide is evolved during this reaction. At the conclusion of the reaction, the mixture is added to water (or a mixture of water and ice) and the insoluble anthraquinone (or derivative thereof) which precipitates is filtered off, washed and dried. Aluminum sulfate may be recovered from the filtrate and washings.

However, for optimum yields and greatest purity of the end product, it is desirable to effect this step of the process in three stages:

(1) The reaction product from the preceding step, consisting of the solution of the aluminum halide salt of the ortho-aroylarylcarboxylic acid in excess diluent, is first decomposed by the addition of water in one of its forms, such as water, ice or steam. Hydrogen halide gas is evolved during this decomposition, and may be conducted off and retured to the process. The reaction here is, for instance:

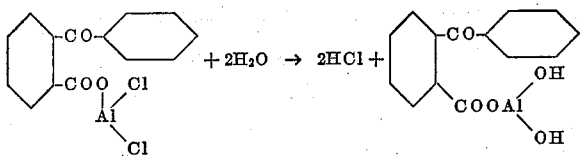

(2) The solvent or diluent which will contain some hydrogen halide is distilled off and returned to the process. The residual aluminum hydroxide compound of the ortho-aroylarylcarboxylic acid is then reacted with aqueous sulfuric acid to form a precipitate of the free ortho-arolyarylcarboxylic acid and a solution of aluminum sulfate. The precipitate is filtered off, washed and dried. Aluminum sulfate may be recovered from the filtrate and washings.

(3) The ortho-aroylarylcarboxylic acid is then condensed to the corresponding anthraquinone derivative by heating at temperatures between 100° C. and 175° C. with three to six times its weight of concentrated or fuming sulfuric acid for a period sufficient to effect substantially complete ring closure.

A preferred but by no means essential feature of this invention involves the recovery of the hydrogen halide evolved in the last two steps of this process and the recycling of this hydrogen halide to the first step of the process.

Hydrogen halide gas is evolved in step (b) in the condensation of the aromatic compound-aluminum halide complex with the phthalic derivative. It is also evolved in step (c) where the aluminum halide salt of the aroylarylcarboxylic acid is ring closed with the sulfuric acid, or in the preferred three-phase effecting of this step wherein the aluminum halide salt of the aroylarylcarboxylic acid is first decomposed with water prior to reaction with and ring closure by sulfuric acid.

In the preferred embodiment of this invention, the hydrogen halide evolved in these steps is recovered, (dried by passing through concentrated sulfuric acid if is is moist), and the dried hydrogen halide is then returned to the first step of the process to form a further quantity of the aromatic compound-aluminum halide complex. In this manner, from 92% to 95% of the hydrogen halide employed in the process may be recovered in each cycle and returned to the process for re-use.

The sulfuric acid employed in this process may also be made to serve several purposes. Starting with fuming sulfuric acid, it may first be employed to dry the hydrogen halide gas evolved in steps (b) and (c) of the process. When diluted to 95%–99%, it may serve to ring close the o-aroylarylcarboxylic acid to the anthraquinone derivative. When the reaction mixture of anthraquinone and sulfuric acid is diluted with water and filtered to recover the precipitated anthraquinone, a portion of the diluted sulfuric acid filtrate may be returned to the second phase of the step (c) to convert the aluminum hydroxide salt of the o-aroylarylcarboxylic acid to the free acid and aluminum sulfate. On crystallizing the filtrate from the o-aroylarylcarboxylic acid, a salable by-product of aluminum sulfate is obtained. For every pound of metallic aluminum employed in this process, eleven pounds of technical alum (17%–18% $Al_2O_3$ equivalent) is recoverable as a valuable by-product.

The following example is given to define and to illustrate this invention but in no way to limit it to reagents, proportions or conditions described therein. Obvious modifications will occur to any person skilled in the art. All proportions given are in part by weight.

*Example*

A cast iron reactor, fitted with an agitator and efficient reflux condenser, is charged with 54 parts of aluminum turnings (2 atoms) and 700 parts of thiophene-free benzene. (For the first batch, 27 parts of anhydrous aluminum chloride may be added as an activator; for succeeding batches 10% of the previous batch of solution of benzene-aluminum chloride complex may be added as an activator.) Dry hydrogen chloride is passed through the agitated, refluxing reaction mixture until the aluminum has dissolved completely. A total of 220–240 parts of HCl will be required for this reaction. When all the aluminum has dissolved, and the formation of benzene-aluminum chloride complex is complete, the reaction mixture is cooled, and is then added over the course of 3 to 4 hours to 150 parts of phthalic anhydride (1 mole) dissolved in 700 parts of benzene. The temperature during the course of the reaction is maintained at 45° C. to 50° C. Hydrogen chloride gas is evolved and is recovered for reuse. When no more HCl gas is evolved, the reaction mixture is heated at 75° C. for one hour, and is thereafter cooled to room temperature. 108 parts of ice are added in small portions to the reaction mixture, which is agitated until hydrogen chloride evolution is complete. The hydrogen chloride gas thus evolved is also recovered for reuse. The recovered HCl gas is dried by scrubbing through concentrated sulfuric acid and is returned to the first step of the process.

The benzene is now distilled off and recovered. The residual aluminum hydroxide salt of o-benzoylbenzoic acid is now slurried for 30 minutes with 1600 parts of 20% aqueous sulfuric acid, and the precipitate of o-benzoylbenzoic acid is filtered from the solution of aluminum sulfate, washed and dried at 110°–115° C. By concentration of the filtrate, a by-product of 590 parts of technical aluminum sulfate (17%–18% $Al_2O_3$) may be recovered. The benzene distilled off will contain some dissolved hydrogen chloride and may be employed to prepare the next batch of benzene-aluminum chloride complex by reaction with the recovered, dried HCl gas (with make-up benzene and HCl being added in each cycle of the process).

The dried filtercake of o-benzoylbenzoic acid is now mixed with 900 parts of 66° Bé. sulfuric acid and heated with stirring at 150° C. for two hours. The reaction mixture is then cooled to room temperature and added with good agitation to 2700 parts of cold water. The precipitate of anthraquinone is filtered off, washed and dried at 110°–120° C. Part of the filtrate from the anthraquinone precipitated may be diluted to 20% $H_2SO_4$ and used in the prior step to precipitate the o-benzoylbenzoic acid from its aluminum salt. The remainder may be reconcentrated if desired to regenerate part of the concentrated sulfuric acid required for the ring closure.

By substituting alkylated or halogenated benzene derivatives for the benzene, or substituted phthalic anhydrides for the phthalic anhydride, in the process of this invention, a wide series of valuable anthraquinone dyestuff intermediates may be obtained, e. g.:

| Aromatic Compound | Phthalic Compound | Anthraquinone Compound |
|---|---|---|
| Toluene | Phthalic anhydride | 2-Methylanthraquinone. |
| o-Xylene | do | 1,2- and 2,3-dimethylanthraquinone. |
| m-Xylene | do | 1,3-dimethylanthraquinone. |
| p-Xylene | do | 1,4-dimethylanthra-9quinone. |
| Ethylbenzene | do | 2-Ethylanthraquinone. |
| n-Butylbenzene | do | 2-n-Butylanthraquinone. |
| Chlorobenzene | do | 2-Chloroanthraquinone. |
| o-Dichlorobenzene | do | 2,3-dichloroanthraquinone. |
| Bromobenzene | do | 2-Bromoanthraquinone. |
| p-Chlortoluene | do | 1-Chloro,4-methylanthraquinone. |
| Benzene | 3,4-dichlorphthalic anhydride | 1,2-dichloroanthraquinone. |
| Do | 3,6-dichlorphthalic anhydride | 1,4-dichloroanthraquinone. |
| Chlorobenzene | 4,5-dichlorphthalic anhydride | 2,3,6-trichloroanthraquinone. |
| Benzene | 3-Methylphthalic anhydride | 1-Methylanthraquinone. |

Having described my invention, what I claim and desire to protect by Letters Patent is:

1. In a process for the manufacture of anthraquinone compounds wherein an aluminum salt of an aroylarylcarboxylic acid is converted to the corresponding aroylarylcarboxylic acid and the said aroylarylcarboxylic acid is cyclized with sulfuric acid, the step which comprises reacting with phthalic anhydride the complexes formed by the reaction of metallic aluminum with a hydrogen halide from the group consisting of hydrogen chloride and hydrogen bromide, and with an aromatic compound of the general formula:

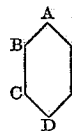

where A, B, C and D are members of the group consisting of hydrogen, lower alkyl substituents, chlorine and bromine and at least two of said members are hydrogen, to form the aluminum salt of the corresponding aroylarylcarboxylic acid.

2. In a process for the manufacture of anthraquinone wherein the aluminum salt of ortho-benzoylbenzoic acid is converted to the ortho-benzoylbenzoic acid and the said ortho-benzoylbenzoic acid is cyclized with sulfuric acid, the step which comprises reacting with phthalic anhydride the complexes formed by the reaction of metallic aluminum with hydrogen chloride and benzene, to form the aluminum salt of ortho-benzoylbenzoic acid.

References Cited in the file of this patent
UNITED STATES PATENTS

| | | |
|---|---|---|
| 1,826,621 | Lloyd et al. | Oct. 6, 1931 |
| 1,895,788 | Daniels | Jan. 31, 1933 |
| 2,496,894 | Smyth et al. | Feb. 7, 1950 |

OTHER REFERENCES

Thomas: Anhydrous Aluminum Chloride in Organic Chemistry, Reinhold Pub. Co., N. Y. (1941), pp. 48, 846, 847, 875.